US010767775B2

(12) United States Patent
Huelsman

(10) Patent No.: US 10,767,775 B2
(45) Date of Patent: Sep. 8, 2020

(54) LOW PROFILE BREAK-OFF CHECK VALVE FOR WET BARREL HYDRANT

(71) Applicant: McWane, Inc., Birmingham, AL (US)

(72) Inventor: Kyle James Huelsman, Oskaloosa, IA (US)

(73) Assignee: McWane, Inc., Birmingham, AL (US)

( * ) Notice: Subject to any disclaimer, the term of this patent is extended or adjusted under 35 U.S.C. 154(b) by 0 days.

(21) Appl. No.: 16/269,861

(22) Filed: Feb. 7, 2019

(65) Prior Publication Data
US 2020/0256474 A1  Aug. 13, 2020

(51) Int. Cl.
| F16K 27/02 | (2006.01) |
| E03B 9/04 | (2006.01) |
| F16K 27/00 | (2006.01) |
| F16K 17/36 | (2006.01) |
| F16K 15/03 | (2006.01) |
| F16K 17/40 | (2006.01) |

(52) U.S. Cl.
CPC .............. *F16K 27/006* (2013.01); *E03B 9/04* (2013.01); *F16K 15/035* (2013.01); *F16K 17/363* (2013.01); *F16K 17/406* (2013.01)

(58) Field of Classification Search
CPC .... F16K 27/006; F16K 17/363; F16K 17/406; F16K 15/035; E03B 9/04
See application file for complete search history.

(56) References Cited

U.S. PATENT DOCUMENTS

| 4,127,142 A | 11/1978 | Snider |
| 4,361,165 A | 11/1982 | Flory |
| 4,445,533 A | 5/1984 | DeFrees |
| 5,099,870 A | 3/1992 | Moore et al. |
| 5,609,179 A | 3/1997 | Knapp |

(Continued)

FOREIGN PATENT DOCUMENTS

CN  207620040 U  12/2017

OTHER PUBLICATIONS

Jones, Break-Off Check Valves, www.joneswaterproducts.com/products/fire-protection/break-check-valves, at least by Oct. 31, 2018.

(Continued)

*Primary Examiner* — Kevin L Lee
(74) *Attorney, Agent, or Firm* — C. Brandon Browning; Maynard, Cooper & Gale, PC

(57) ABSTRACT

A hydrant valve assembly including a valve body including an exit end, a lip extending radially outward from the exit end, a valve seat and a first valve member selectively movable between a first orientation whereby the first valve member is not engaged with the valve seat and a second orientation whereby the first valve member is engaged with the valve seat. An annular retaining plate is supported on the exit end of the valve body and includes a first rod extending downwardly into the valve body, the first rod being arranged to selectively maintain the first valve member in the first orientation. A flange is detachably engaged with and concentrically arranged around the lip, and a barrel is supported on the retaining plate. A plurality of connectors extends through the barrel, the retaining plate and the flange for rigidly coupling the barrel to the retaining plate and flange.

18 Claims, 5 Drawing Sheets

(56) References Cited

U.S. PATENT DOCUMENTS

| | | | |
|---|---|---|---|
| 5,803,110 A * | 9/1998 | Segal | E03B 9/02 |
| | | | 137/305 |
| 6,401,745 B1 | 6/2002 | Corder | |
| 7,128,083 B2 | 10/2006 | Fleury, Jr. et al. | |
| 7,156,119 B2 | 1/2007 | Freudendahl | |
| 8,991,415 B1 | 3/2015 | Luppino | |
| 9,334,976 B1 | 5/2016 | Wood | |
| 9,353,878 B2 | 5/2016 | Plummer et al. | |
| 9,890,866 B2 | 2/2018 | Kitchen et al. | |
| 10,060,101 B2 | 8/2018 | Plummer | |
| 2005/0224114 A1 | 10/2005 | Cook et al. | |
| 2006/0016479 A1 * | 1/2006 | Gonzales | E03B 9/16 |
| | | | 137/283 |
| 2010/0132806 A1 | 6/2010 | Burczynski | |
| 2012/0042968 A1 | 2/2012 | Shanker | |
| 2018/0171606 A1 * | 6/2018 | Kitchen et al. | E03B 9/04 |

OTHER PUBLICATIONS

American AVK Company, Series 2488: Flowguard II Hydrant Check Valve, www.americanavk.com/hseries2488.aspx, at least by Oct. 31, 2018.

* cited by examiner

LOW PROFILE BREAK-OFF CHECK VALVE FOR WET BARREL HYDRANT

FILED OF THE INVENTION

The present invention is directed to a fire hydrant check valve, and more particularly, to a low profile check valve assembly for use with a wet barrel fire hydrant, the valve assembly including a hydrant barrel, a valve body containing a valve seat and a valve flap, a retaining plate including a rod extending between the valve flap with the valve seat, and a frangible flange arranged around the valve body, the retaining plate and a portion of the valve body being pressed between the barrel and the flange thereby detachably coupling the barrel to the valve body.

BACKGROUND OF THE INVENTION

Fire hydrant check valves are known in the industry. Such valves are designed to prevent water waste and property damage caused inadvertently when a fire hydrant is struck accidentally by a moving motor vehicle and dislodges from the water supply pipe. For example, U.S. Pat. No. 9,890,866 discloses a hydrant shear valve for a hydrant coupled in fluid communication with a hydrant water supply pipe having a pipe flange. The valve includes a valve body having fastener receiving openings for mounting the valve in fluid communication between the hydrant and the water supply pipe, the valve body having a valve seat, and a two-piece valve member having two separate valve member portions each separately and independently pivotally mounted in the valve body to move independently between open positions and closed positions. The separate valve member portions are disposed overlapping one another axially aligned within the valve body in the open position and disposed in a co-planar configuration in engagement with the valve seat in the closed position. A pair of bias members are provided for maintaining releaseably the valve member portions in the open position and permitting at least one of the valve member portions to be moved toward the closed position under a force of fluid flowing from the supply pipe. A pair of oppositely disposed recesses are provided in the top portion of the valve body, the pair of bias members including separate L-shaped bias members having rods for engaging the valve body recesses and each having a foot fixed to one of the valve members. The bias member rods are held down by the hydrant in the valve body recesses when the two-piece valve member is disposed in the open position and permitted to move freely out of the recesses when the hydrant is at least partially dislodged from the valve body. At least one actuator is provided for freeing the bias members to permit the valve member portions to move independently toward the closed position under the force of water pressure when the hydrant is hit with sufficient impact.

U.S. Pat. No. 10,060,101 discloses a dual plate backflow and breakaway check valve designed to mount above grade. The dual plate check valve includes a barrel assembly having an upper portion, a lower portion and an annular groove. An upper dual valve includes an upper front plate and an upper back plate. A lower dual valve includes a lower front plate and a lower back plate. A lower valve keeper bar moves up from between a plurality of lower valve stay tabs upon breakage of the annular groove thereby allowing the lower front plate and the lower back plate to rotate about a lower valve pin and closing the lower dual valve upon a lower barrel bevel and simultaneously allowing the upper front plate and the upper back plate to rotate about an upper valve pin and closing upon an upper barrel bevel.

U.S. Patent Application Publication No. 20050224114 discloses a pipe coupling for use with a fire hydrant having automatic shut-off features in the event of breakage of the fire hydrant. The breakaway pipe coupling includes an extension join to a valve body with a flow passage way extending through the extension and valve body. A shut-off valve is moveably mounted to the extension and is bois for movement toward a valve seat located in the valve body. A wedge extends between the extension and the shut-off valve, wedging the shut-off valve in a open position away from the valve seat. Extension and valve are separably joined together in that the extension includes a frangible portion which severs upon application of an impact force to pipe coupling. This allows the wedge to become dislodged, with the shut-off valve being urged in a position towards the valve seat.

SUMMARY OF THE INVENTION

The present invention is directed to a low-profile break-off check valve for use with a wet barrel fire hydrant. According to a first aspect of the invention, there is provided a hydrant valve assembly including a valve body defining a first fluid pathway and including an entry end through which water may enter the valve body and an exit end through which water may exit the valve body. The valve body further includes a valve seat, a first cross-bar extending across the first fluid pathway and a first valve member rotatably coupled to the first cross-bar and selectively movable between a first orientation whereby the first valve member is not engaged with the valve seat so that water may flow along the first fluid pathway and a second orientation whereby the first valve member is engaged with the valve seat so that water flow along the first fluid pathway is at least partially obstructed.

An annular retaining plate is operatively coupled to the exit end of the valve body, the annular retaining plate defining a second fluid pathway that is in fluid communication with the first fluid pathway. The retaining plate includes a top side, a bottom side supported on the exit end of the valve body and a first rod extending downwardly from the bottom side into the first fluid pathway. The first rod is arranged to selectively maintain the first valve member in the first orientation so that water may flow along the first and second fluid pathways.

Located underneath the annular retaining plate is a flange. The flange is formed by a pair of semi-annular pieces that are detachably engaged with and concentrically arranged around a continuous lip of the valve body, the lip extending radially outward from the exit end.

A barrel is supported on the top side of the retaining plate which includes a third fluid pathway that is fluidly coupled to the second fluid pathway. A plurality of connectors extend through the barrel, the retaining plate and the flange for rigidly coupling the barrel to the retaining plate and flange. In one embodiment, the plurality of connectors are bolts that do not extend through the lip so that the barrel is not bolted directed to the valve body.

In use, the hydrant valve assembly provides means for obstructing water flow through the valve body when the barrel is disengaged from the valve body by the application of force perpendicularly to a longitudinal axis of the barrel, e.g., striking the barrel with a motor vehicle. In particular, when such force is applied to the barrel, the barrel and the retaining plate are together separated from the valve body thereby withdrawing the first rod from the first fluid pathway and out from between the first valve member and the valve seat. The barrel and retainer ring disengage from the valve body via the flange's disengagement from the valve body lip, which may occur by the flange shattering or otherwise breaking apart. Water flow and pressure within the valve body then cause the first valve member to rotate upwards until the first valve member engages the valve seat thereby obstructing water flow therethrough. This way, the hydrant is detached from the valve body and water flow out of the valve body obstructed without damaging the valve body, in part, because the barrel is not directly bolted to the valve body.

According to another aspect of the invention there is provided a hydrant valve assembly including a valve body defining a first pathway and including an exit end, a valve seat and a pair of valve members, the pair of valve members being selectively movable between an open position whereby the pair of valve members are not engaged with the valve seat and a closed position whereby the pair of valve members are engaged with the valve seat. A cross-bar extends across the first fluid pathway to which the pair of valve members are rotatably coupled.

A retaining plate is supported on the exit end of the valve body, the retaining plate defining a second pathway that is in fluid communication with the first pathway. The retaining plate includes a top side, a bottom side supported directly on the exit end of the valve body and a pair of rods extending downwardly from the bottom side into the first fluid pathway. The pair of rods are arranged to maintain the pair of valve members in the open position. In one embodiment, the retaining plate includes a support member extending across the second pathway from which the pair of rods extend into the first pathway, the support member and the cross-bar being substantially aligned so to decrease their effect on the flow of water through the first and second pathways. When the pair of valve members are in the open position, the pair of rods extend essentially parallel to a longitudinal axis of the valve body and sandwich the pair of valve members there between.

A barrel is supported on the top side of the retaining plate, the barrel defining a third pathway that is in fluid communication with the second pathway. The barrel is rigidly coupled to the retaining plate and a ring assembly that is concentrically arranged around the exit end of the valve body. To secure the barrel to the valve body, the retaining plate and a portion of the exit end of the valve body are pressed between the ring assembly and the barrel. In one embodiment, the barrel is rigidly coupled to the retaining plate and the ring assembly by bolts which are spaced apart from and do not contact the valve body.

In use, the pair of valve members are selectively movable from the open position to the closed position by separating the barrel from the valve body, with the retaining plate remaining coupled to the barrel. This is accomplished by forming the ring assembly from at least one ring member including an annular groove having a length of decreased thickness in the at least one ring member, the length of decreased thickness being configured to cause the ring assembly to disengage from the exit end of the valve body when sufficient force is applied to the barrel.

According to yet another aspect of the invention, there is provided a hydrant valve assembly including, from a proximal end to a distal end of the valve assembly, a hydrant barrel, a retaining plate, and a valve body. In one embodiment, the valve body defines a first pathway and includes a valve seat and a first valve member configured for engagement with the valve seat for selectively obstructing the first pathway. In another embodiment, the annular retaining plate defines a second pathway that is in fluid communication with the first pathway, the retaining plate including a first elongate member extending distally into the first pathway and arranged for preventing engagement of the first valve member with the valve seat. In another embodiment, the hydrant barrel defines a third pathway that is in fluid communication with the second pathway. In yet another embodiment, the assembly includes a ring concentrically arranged around the valve body, wherein the retaining plate and a portion of the valve body are pressed between the barrel and the ring thereby detachably coupling the hydrant barrel to the valve body. The ring is fabricated from a material, e.g., gray iron or grey cast iron, that is stiff but has less tensile strength than the materials from which the hydrant and valve body are fabricated, e.g., ductile iron or bronze, so that failure of the valve assembly upon being struck by a motor vehicle occurs in the ring. Additionally, the annular retaining plate may include a second elongate member extending distally into the first pathway, and the valve body may include a second valve member, the second elongate member being arranged for preventing engagement of the second valve member with the valve seat. In this embodiment, each of the first valve member and the second valve member is a semi-circular flap pivotally coupled about a rod.

DETAILED DESCRIPTION OF THE INVENTION

Figure 1:
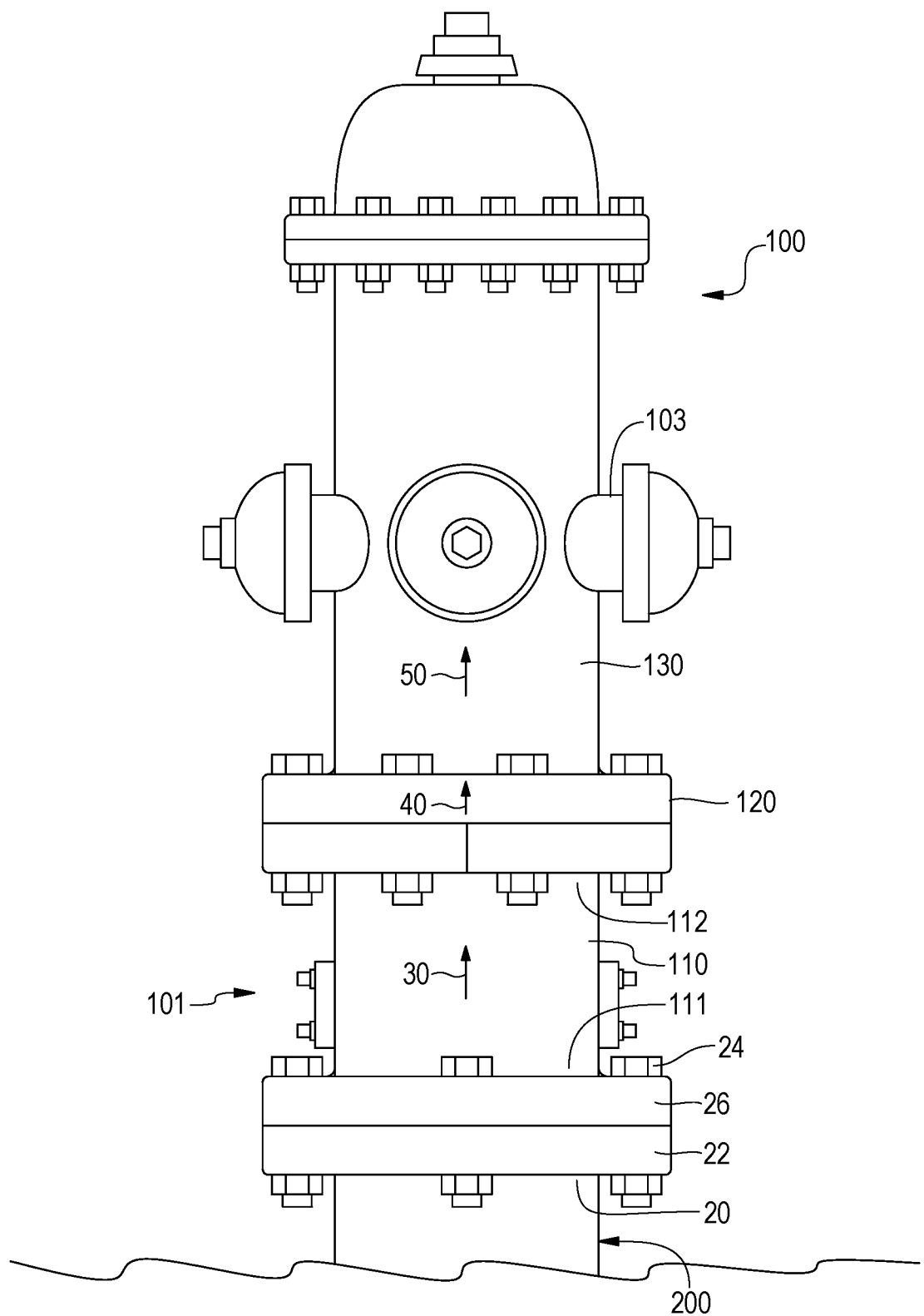
FIG. 1 is an elevational view of a wet barrel fire hydrant coupled to a water pipe by a low profile, break off check valve in accordance with the present invention.

The present invention is directed to a low-profile break-off check valve assembly 101 for rigidly and selectively detachably coupling a wet barrel fire hydrant 100 to a water pipe 200, check valve assembly 101 being configured for stemming or preventing water flow from pipe 200 through the check valve assembly 101 when hydrant 100 is impacted with a force sufficient to decouple hydrant 100 from pipe 200. Such impacts typically occur when a motor vehicle 250 strikes hydrant 100. Generally, check valve assembly 101 includes a valve body 110 including a first orientation whereby water flow from pipe 200 is allowed to flow through valve body 110 and a second orientation whereby water flow from pipe 200 through the valve body 110 is decreased or prevented, a retaining plate 120 configured for maintaining valve body 110 in the first orientation when hydrant 100 is operatively coupled to water pipe 200 and allowing the valve body 110 to transition from the first orientation to the second orientation when hydrant 100 is forcibly decoupled from pipe 200, and a safety flange 140 configured for rigidly coupling hydrant 100 to water pipe 200 via valve body 110, while allowing hydrant 100 to be forcibly detached from water pipe 200 without detaching valve body 110 from pipe 200.

Referring to FIG. 1, there is depicted check valve assembly 101 operatively and fluidly coupled to and between wet barrel hydrant 100 and water pipe 200. Arranged in this manner, valve assembly 101 directs a water flow supplied by water pipe 200 to hydrant 100 at a pressure of at least 20 pounds per square inch (psi) to over 120 psi. In particular, water pipe 200 includes a pipe outlet 20 and a pipe outlet flange 22, which may be above or below grade. Valve body 110 is rigidly secured to pipe 200 with bolt assemblies 24 which extend through pipe outlet flange 22 and a valve body entry flange 26. When operatively secured to water pipe 200, valve body 110 defines a first fluid pathway 30 extending to and between a valve body entryway 111 and a valve body exit 112. Further, a barrel 130 is secured proximate the valve body exit 112 through a retaining plate 120, as will be described in detail later. When the barrel 130 is operatively coupled to the valve assembly 101, the retaining plate 120 defines a second fluid pathway 40 which may be in fluid communication with the first fluid pathway 30 and the barrel 130 defines a third fluid pathway 50 in fluid communication with second fluid pathway 40 in such that the fluid is available for further use (e.g., to deliver water from the hydrant barrel 130 through one or more outlets 103). In the depicted embodiment, the valve body 110 is a low profile, wherein the length of the assembly 101 is relative short than the hydrant 100 and the pipe 200 and wherein the valve body 110 may not be directly contacted by a motor vehicle 250 in the event a motor vehicle 250 is driven into the hydrant 100 and/or over the water pipe 200.

Figure 2:
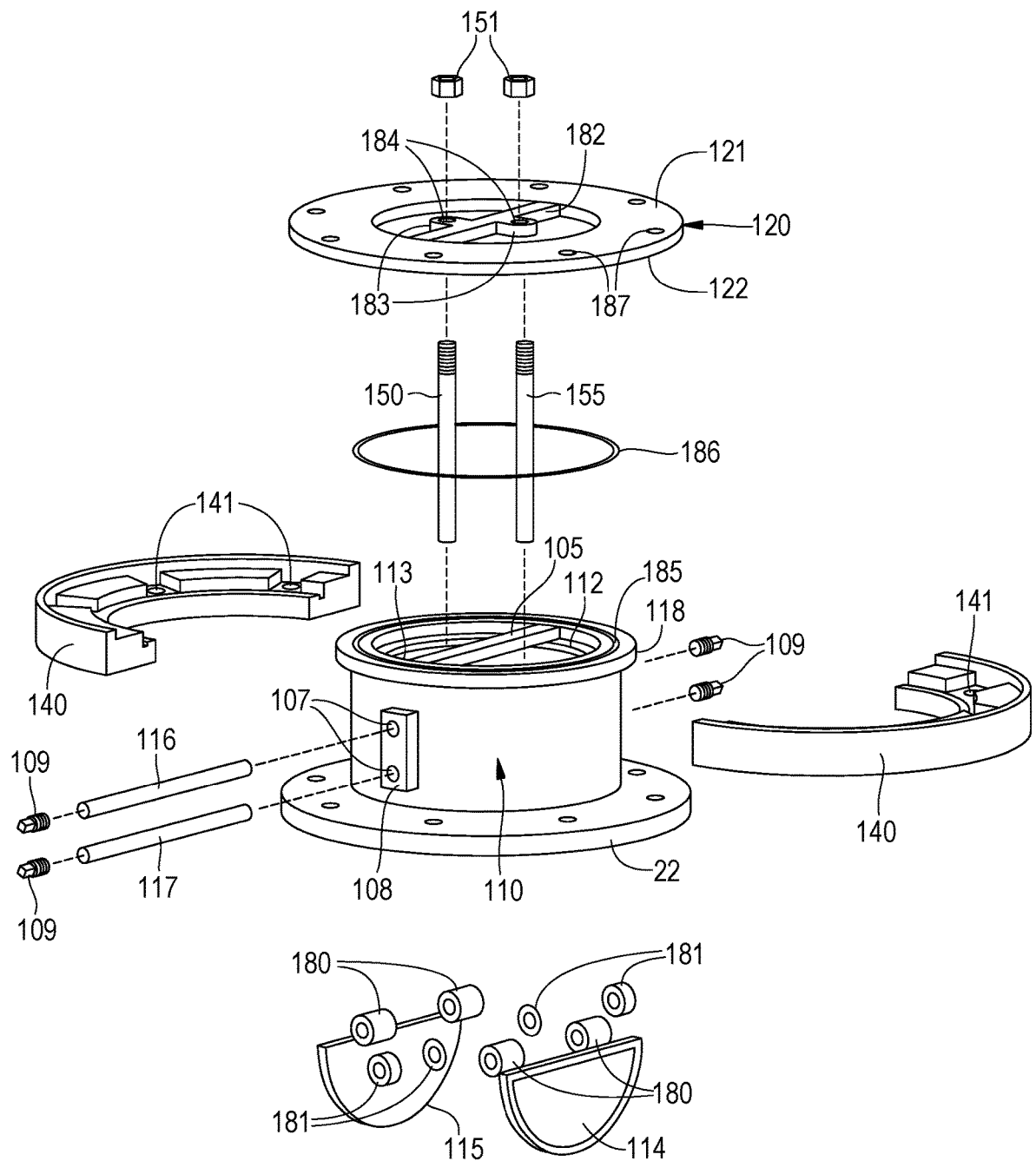
FIG. 2 is an exploded perspective view of the check valve of FIG. 1.

FIG. 2 depicts the exploded view of the valve assembly 101. The valve body 110 includes a valve seat 113, one or more valve members (114, 115), one or more cross-bars (116, 117) and a lip 118 radially running proximate the Valve body exit 112. In an exemplary embodiment as depicted by FIG.2, the valve body 110 may include a first valve member 114, a second valve member 115, a first cross-bar 116 and a second cross-bar 117. Although, in other embodiments, any number of valve members and cross-bars may be possible.

The valve seat 113 runs radially on an interior of the valve body 110, wherein the valve seat 113 may be configured to engage the valve members 114, 115 . The first valve member 114 and the second valve member 115 are configured to move between a first orientation 160 (referred to hereinafter as "open position") (FIG. 3) and a second orientation 170 (referred to hereinafter as "closed position") (FIG. 4). The first cross-bar 116 and the second cross-bar 117 are transversely arranged in the valve body 110 and the valve members 114,115 are configured to be coupled with the at least one of the cross-bar. The cross-bars 116, 117 are configured to support the valve members 114, 115 to toggle between the open position 160, whereby the first valve member 114 and the second valve member 115 are not engaged with the valve seat 113 so that water may flow along the first fluid pathway 30 and the closed position 170 whereby the first valve member 114 and the second valve member 115 are engaged with the valve seat 113 so that water flow along the first fluid pathway 30 is at least partially obstructed. The first valve member 114 and the second valve member 115 comprises plurality of sleeves 180 spaced apart to mount the valve members 114,115 to at least one of the cross-bar. Further, one or more washers 181 made of copper alloy and may be used to assist in mounting of the first valve member 114 and the second valve member 115 to at least one of the cross-bar. The diameter of the first valve member 114 and the second valve member 115 is chosen, the valve members 114,115 when engaged with the valve seat 113 may cover the entire flow area in the first fluid pathway 30. In an exemplary embodiment as depicted by FIG. 2, the first valve member 114 and the second valve member 115 are semicircular flap and may be made of copper alloy. Although, in other embodiments, other configurations of the valve members 114,115 are possible.

The first cross-bar 116 and the second cross bar 117 are assembled and coupled to the valve body 110 through a plurality of holes 107, present in a plurality of Valve body tabs 108 available on an outer surface of the valve body 110. In the depicted embodiment, the valve body tabs 108 are diametrically opposite to each other, such that the cross-bars 116, 117 are received between the holes 107 in the diametrically opposite tabs 108. Further, the cross-bars 116, 117 may be secured by using plurality of plugs 109. The first valve member 114 and the second valve member 115 are coupled to the first cross-bar 116, such that the first valve member 114 and the second valve member 115 may pivot about the first cross-bar 116 to toggle between the open position 160 and the closed position 170. Further, the second cross-bar 117 may assist the valve members 114, 115 in the open position 160, as will be described in detail later. Further, in the depicted embodiment, the first-crossbar 116 and the second cross-bar 117 are cylindrical rods and the ends of the cross-bar 116, 117 are threaded inside to receive threaded plugs 109 for securement onto the valve body 110. Furthermore, the first cross-bar 116 and the second cross-bar 117 are parallel to each other and are spaced apart. The cross-bars 116, 117 and the plugs 109 may be made of stainless steel.

The valve body 110 includes a support bar 105 running along a transverse direction of the valve body 110 proximate the valve body exit 112. In the depicted embodiment, the valve body 110 may be made of ductile iron. In other embodiments, other configurations of the valve body 110 may be possible.

An annular retaining plate 120 is operatively coupled to the valve body exit 112. The annular retaining plate 120 defines the second fluid pathway 40, which is in fluid communication with the first fluid pathway 30. The retaining plate 120 includes a top side 121, a bottom side 122 supported on the Valve body exit 112, one or more rods 150,155 extending downwardly from the bottom side into the first fluid pathway 30 and a plurality of holes 187 for coupling with the flange 140 and the barrel 130. In the depicted embodiment, a pair of rods including a first rod 150 and a second rod 155 are used. In other embodiments, any number of rods may be used. The first rod 150 and the second rod 155 are arranged to selectively maintain the first valve member 114 and the second valve member 115 in the open position 160 so that water may flow along the first fluid pathway 30 and second fluid pathway 40. In a particular embodiment, the retaining plate 120 includes a support element 182 with one or more support members 183 and support holes 184 across the second fluid pathway 40, wherein the first rod 150 and the second rod 155 extend from the support members 183. Further in the depicted embodiment, the first rod 150 and the second rod 155 may be threaded and may receive threaded lock nuts 151, to be secured with the retaining plate 120. Also, the retaining plate 120 may be made of steel and the rods 150, 155 may be made of stainless steel. In other embodiments, other arrangements of retaining plate 120 with other kinds of coupling mechanisms may be possible.

In the depicted embodiment, the valve body may further include a groove 185 to accommodate O-ring 186 to facilitate the sealing of the retaining plate 120 to the valve body exit 112. Further, the O-ring 186 may be made of rubber.

The flange 140 is located underneath the retaining plate 120. The flange 140 is formed by a pair of semi-annular pieces that are detachably engaged with and concentrically arranged around a continuous lip 118 of the valve body 110, the lip 118 extending radially outward from the valve body exit 112. Further, the flange 140 includes a plurality of holes 141 to enable coupling with the barrel 130 and the retaining plate 120. In the depicted embodiment, the flange 140 may be made of grey iron. In other embodiments, other types of flange 140 may be possible.

A barrel 130 is supported on the top side of the retaining plate 120 which includes a third fluid pathway 50 that is fluidly coupled to the second fluid pathway 40. As mentioned above, the barrel 130 is secured proximate the valve body exit 112 through the retaining plate 120, wherein a plurality of connectors 25 extend through the barrel 130, the retaining plate 120 (via the plurality of holes 181) and the flange 140 (via the plurality of holes 141), for rigidly coupling the barrel 130 to the retaining plate 120 and flange 140. In an exemplary embodiment, the plurality of connectors 25 are bolt assemblies that are space apart and do not extend through the lip 118 so that the barrel 130 is not bolted directed to the valve body 110.

Figure 3:
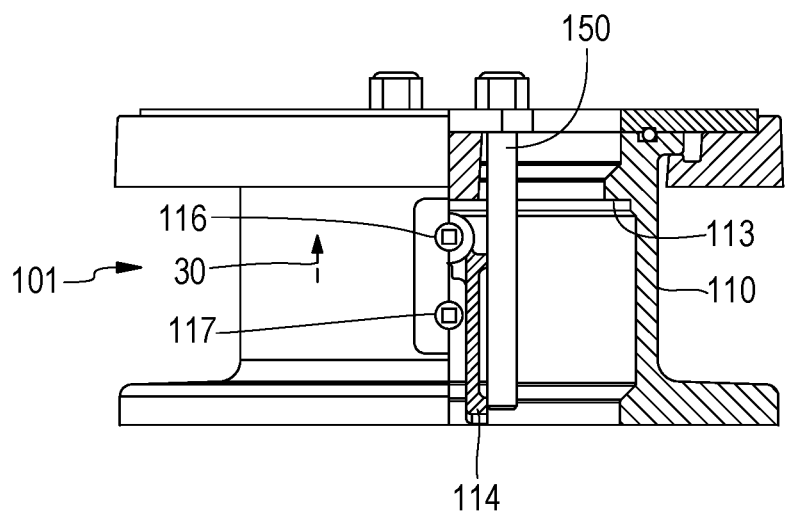
FIG. 3 is a partial sectional view of the check valve of FIG. 1 in an open orientation.
Figure 4:
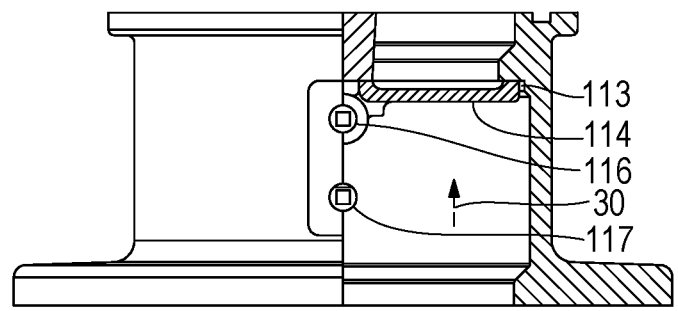
FIG. 4 is a partial sectional view of the check valve of FIG. 1 in a closed orientation.
Figure 5:
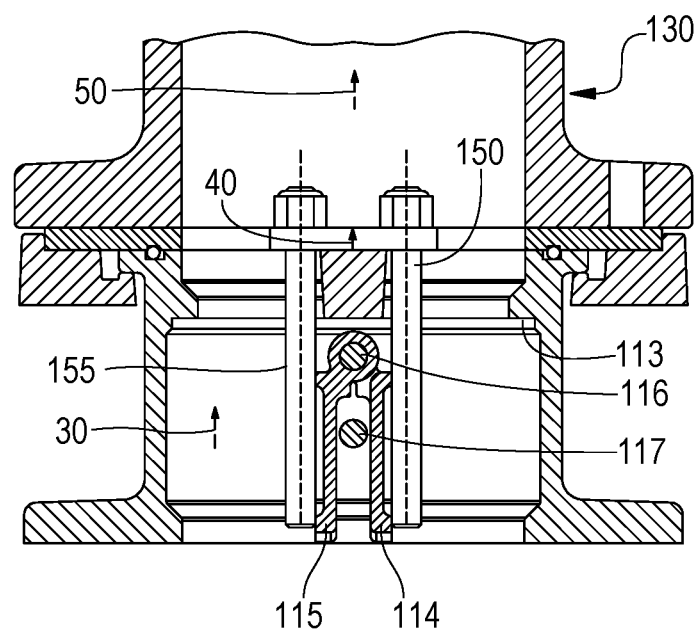
FIG. 5 is a sectional view of the wet barrel hydrant and check valve of FIG. 1 showing the check valve in an open orientation.

FIG. 3 and FIG. 5 depict partial sectional view and fragmented sectional view of the check valve assembly 101 in the open position 160. In the open position 160, the first valve member 114 rotatably coupled to the first cross-bar 116, is positioned between the first rod 150 and the second cross-bar 117 and spaced away from the valve seat 113, wherein the first valve member 114 is positioned along the longitudinal axis of the valve body 110 and in a direction parallel to the first rod 150. Similarly, the second valve member 115 rotatably coupled to the first cross-bar 116, is held between the second rod 155 and the second cross-bar 117 and spaced away from the valve seat 113, wherein the second valve member 115 is positioned along the longitudinal axis of the valve body 110 and in a direction parallel to the second rod 155. Further, in the open position 160, the valve members 114,115 are sandwiched between the first rod 150 and the second rod 155, wherein the valve members 114,115 may rest against the second cross-bar 117. The aforementioned configuration enables the water from the pipe 200 to enter the valve body 110 and flow from the first fluid pathway 30 through the third fluid pathway 50 (into the barrel 130) without any obstruction and may be drawn from the hydrant 100 for further use.

Figure 6:
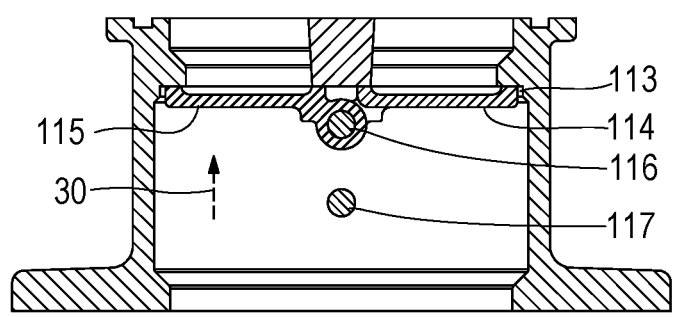
FIG. 6 is a sectional view of the check valve of FIG. 1 in a closed orientation.
Figure 7:
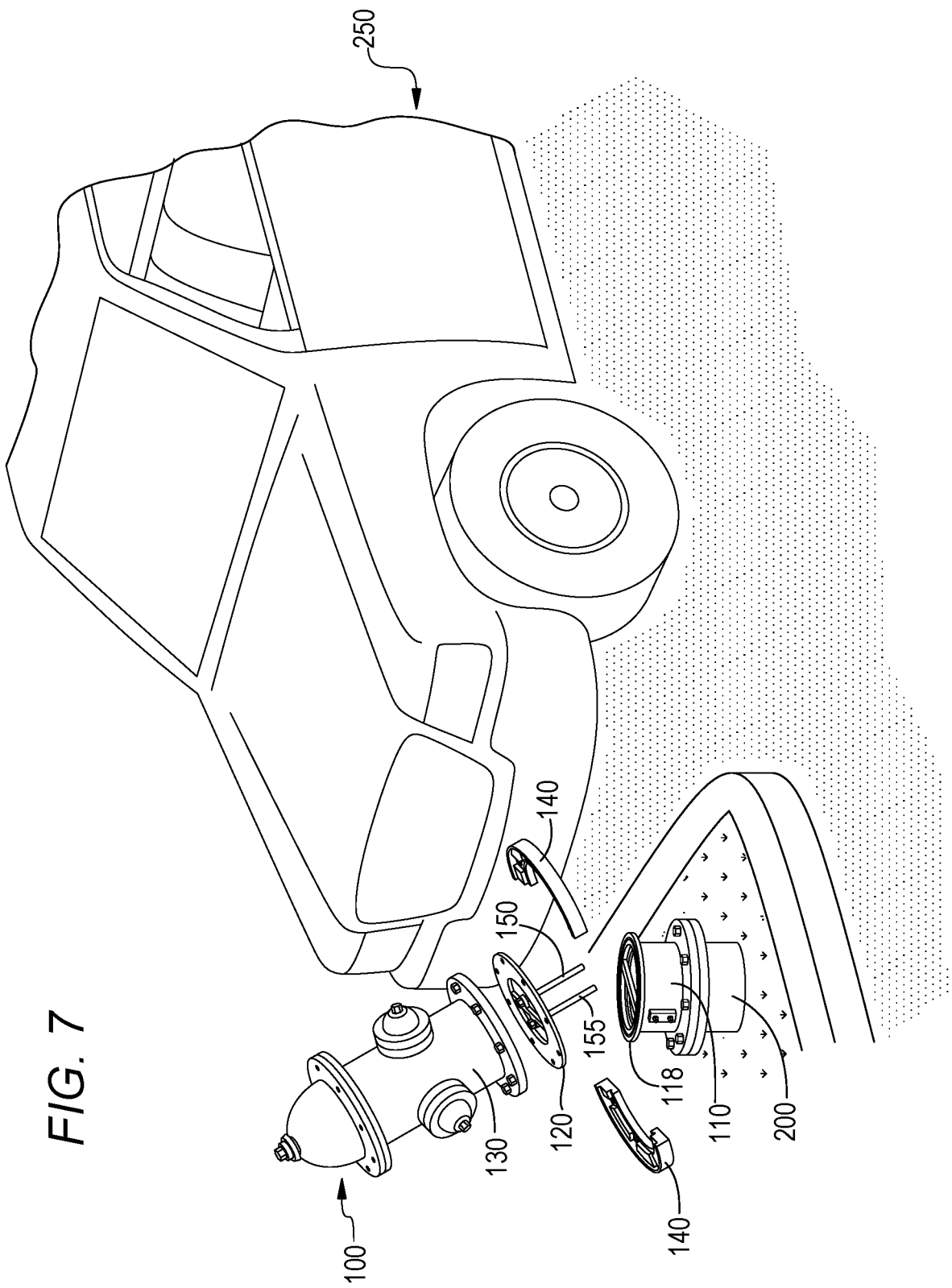
FIG. 7 is a perspective view of the wet barrel fire hydrant, water pipe and check valve of FIG. 1 showing detachment of the fire hydrant from the water pipe upon being struck by a motor vehicle.

FIG. 4 and FIG. 6 depict partial sectional view and fragmented sectional view of the check valve assembly 101 in the closed position 170 and FIG. 7 depicts a scenario wherein a motor vehicle 250 strikes the fire hydrant 100. Referring to FIG. 7, in the event of a motor vehicle 250 striking the fire hydrant 100, the force is applied perpendicular to the longitudinal axis of the barrel 130, such that the barrel 130 and the retaining plate 120 are together separated from the valve body 110. The barrel 130 and retainer plate 120 disengage from the valve body 110 through the flange's 140 disengagement from the valve body lip 118, which may occur by the flange 140 shattering or breaking apart. As the retainer plate 150 separates from the valve body 110, the first rod 150 and the second rod 155 coupled to the retainer plate 150, are withdrawn from the first fluid pathway 30. Subsequently, as the rods 150,155 are withdrawn and pressure due to the water flow within the valve body 110 may cause the first valve member 114 and the second valve member 115 to rotate upwards about the first cross-bar 116, until the first valve member 114 and the second valve member 115 engage with the valve seat 113, to attain the closed position 170 (Referring to FIG. 4 and FIG. 6). The first valve member 114 and the second valve member 115, when engaged with the valve seat 113 covers the entire flow area in the first fluid pathway 30, thereby obstructing water flow there through.

As will be apparent to one skilled in the art, various modifications can be made within the scope of the aforesaid description. Such modifications being within the ability of one skilled in the art form a part of the present invention and are embraced by the claims below. For example, it is contemplated that a single, circular valve flapper may be used in combination with a single retaining plate rod for maintaining the circular valve flapper disengaged from a valve seat 113. It is also contemplated that the safety flange 140 may be formed from a single, continuous ring member or three or more separate curved pieces, which may form a continuous ring around a valve body 110 or valve body lip 118 or a disjointed ring.

I claim:

1. A hydrant valve assembly comprising:
a valve body defining a first fluid pathway and including an exit end, a lip extending radially outward from the exit end, a valve seat and a first valve member, the first valve member being selectively movable between a first orientation whereby the first valve member is not engaged with the valve seat and a second orientation whereby the first valve member is engaged with the valve seat,
an annular retaining plate defining a second fluid pathway therethrough that is in fluid communication with the first fluid pathway, the retaining plate including a top side, a bottom side supported on the exit end of the valve body and a first rod extending downwardly from the bottom side into the first fluid pathway, the first rod being arranged to selectively maintain the first valve member in the first orientation,
a flange detachably engaged with and concentrically arranged around the lip,
a barrel supported on the top side of the retaining plate and including a third fluid pathway therethrough that is fluidly coupled to the second fluid pathway, and
a plurality of connectors extending through the barrel, the retaining plate and the flange, the plurality of connectors rigidly coupling the barrel to the retaining plate and the flange,
wherein, when the barrel is disengaged from the valve body by applying force perpendicularly to a longitudinal axis of the barrel, the retaining plate is disengaged from the valve body thereby withdrawing the first rod from first fluid pathway and allowing the first valve member to transition to the second orientation.

2. The assembly of claim 1 wherein the plurality of connectors does not extend through the lip.

3. The assembly of claim 1 wherein the flange is formed by a pair of semi-annular pieces.

4. A hydrant valve assembly comprising:
a valve body defining a first fluid pathway and including an exit end, a lip extending radially outward from the exit end, a valve seat and a first valve member, the first valve member being selectively movable between a first orientation whereby the first valve member is not engaged with the valve seat and a second orientation whereby the first valve member is engaged with the valve seat, an annular retaining plate defining a second fluid pathway therethrough that is in fluid communication with the first fluid pathway, the retaining plate including a top side, a bottom side supported on the exit end of the valve body and a first rod extending downwardly from the bottom side into the first fluid pathway, the first rod being arranged to selectively maintain the first valve member in the first orientation, a flange detachably engaged with and concentrically arranged around the lip, a barrel supported on the top side of the retaining plate and including a third fluid pathway therethrough that is fluidly coupled to the second fluid pathway, and a plurality of connectors extending through the barrel, the retaining plate and the flange, the plurality of connectors rigidly coupling the barrel to the retaining plate and the flange, wherein the valve body includes a second valve member and the retaining plate includes a second rod extending downwardly from the bottom side into the first fluid pathway, the second rod being arranged to selectively maintain the second valve member spaced apart from the valve seat.

5. A hydrant valve assembly comprising:

a valve body defining a first fluid pathway and including an exit end, a lip extending radially outward from the exit end, a valve seat and a first valve member, the first valve member being selectively movable between a first orientation whereby the first valve member is not engaged with the valve seat and a second orientation whereby the first valve member is engaged with the valve seat, an annular retaining plate defining a second fluid pathway therethrough that is in fluid communication with the first fluid pathway, the retaining plate including a top side, a bottom side supported on the exit end of the valve body and a first rod extending downwardly from the bottom side into the first fluid pathway, the first rod being arranged to selectively maintain the first valve member in the first orientation, a flange detachably engaged with and concentrically arranged around the lip, a barrel supported on the top side of the retaining plate and including a third fluid pathway therethrough that is fluidly coupled to the second fluid pathway, and a plurality of connectors extending through the barrel, the retaining plate and the flange, the plurality of connectors rigidly coupling the barrel to the retaining plate and the flange, wherein the valve body includes a first cross-bar extending across the first fluid pathway to which the first valve member is rotatably coupled.

6. The assembly of claim 5 wherein the valve body includes a second cross-bar, the first valve member being positioned between the first rod and the second cross-bar.

7. A hydrant valve assembly comprising:

a valve body defining a first pathway and including an exit end, a valve seat and a pair of valve members, the pair of valve members being selectively movable between an open position whereby the pair of valve members are not engaged with the valve seat and a closed position whereby the pair of valve members are engaged with the valve seat, a retaining plate defining a second pathway that is in fluid communication with the first pathway, the retaining plate including a top side, a bottom side supported on the exit end of the valve body and a pair of rods extending downwardly from the bottom side into the first fluid pathway, the pair of rods being arranged to maintain the pair of valve members in the open position, a ring assembly concentrically arranged around the exit end, and a barrel supported on the top side of and rigidly coupled to the retaining plate and the ring assembly, the barrel including a third pathway that is fluidly coupled to the second pathway, wherein the retaining plate and a portion of the exit end of the valve body are pressed between the ring assembly and the barrel thereby coupling the barrel to the valve body.

8. The assembly of claim 7 wherein the pair of valve members are selectively movable from the open position to the closed position by separating the barrel from the valve body while the retaining plate is rigidly coupled to the barrel.

9. The assembly of claim 7 wherein, when the pair of valve members are in the open position, the pair of rods extend along a longitudinal axis of the valve body.

10. The assembly of claim 7 wherein the barrel is rigidly coupled to the retaining plate and the ring assembly by bolts, wherein the bolts are spaced apart from and do not contact the valve body.

11. The assembly of claim 7 wherein the retaining plate includes a support member extending across the second pathway, wherein the pair of rods extend from the support member.

12. The assembly of claim 11 wherein the valve body includes a cross-bar extending across the first fluid pathway to which the pair of valve members are rotatably coupled, the support member and the cross-bar being substantially aligned.

13. The assembly of claim 7 wherein the ring assembly is formed by at least one ring member including an annular groove forming a length of decreased thickness in the at least one ring member, the length of decreased thickness being configured to cause the ring assembly to disengage from the exit end of the valve body when force is applied to the barrel.

14. A hydrant valve assembly comprising:

from a proximal end to a distal end of the valve assembly, a hydrant barrel, a retaining plate, and a valve body, wherein the valve body defines a first pathway and includes a valve seat and a first valve member configured for engagement with the valve seat for selectively obstructing the first pathway, wherein the retaining plate defines a second pathway that is in fluid communication with the first pathway, the retaining plate including a first elongate member extending distally into the first pathway and arranged for preventing engagement of the first valve member with the valve seat, wherein the hydrant barrel defines a third pathway that is in fluid communication with the second pathway and wherein the hydrant barrel is rigidly coupled to the retaining plate by bolt assemblies, wherein the bolt assemblies are spaced apart from and do not contact the valve body.

15. The assembly of claim 14 including a ring concentrically arranged around the valve body, wherein the retaining plate and a portion of the valve body are pressed between the barrel and the ring thereby detachably coupling the hydrant barrel to the valve body.

16. The assembly of claim 15 wherein the ring is fabricated from gray iron.

17. A hydrant valve assembly comprising:
from a proximal end to a distal end of the valve assembly, a hydrant barrel, a retaining plate, and a valve body,
wherein the valve body defines a first pathway and includes a valve seat and a first valve member configured for engagement with the valve seat for selectively obstructing the first pathway,
wherein the retaining plate defines a second pathway that is in fluid communication with the first pathway, the retaining plate including a first elongate member extending distally into the first pathway and arranged for preventing engagement of the first valve member with the valve seat,
wherein the hydrant barrel defines a third pathway that is in fluid communication with the second pathway, and
wherein the annular retaining plate includes a second elongate member extending distally into the first pathway and the valve body includes a second valve member, the second elongate member being arranged for preventing engagement of the second valve member with the valve seat.

18. The assembly of claim 17 wherein each of the first valve member and the second valve member is a semicircular flap rotatably coupled to a rod.

\* \* \* \* \*